United States Patent [19]
Hansen

[11] 3,846,950
[45] Nov. 12, 1974

[54] HYDRAULICALLY EXTENSIBLE STRUT

[75] Inventor: Siegfried Hansen, West Los Angeles, Calif.

[73] Assignee: Hughes Aircraft Company, Culver City, Calif.

[22] Filed: June 11, 1973

[21] Appl. No.: 368,910

Related U.S. Application Data

[63] Continuation of Ser. No. 235,740, March 17, 1972, abandoned.

[52] U.S. Cl............................ 50/632, 52/1, 52/573
[51] Int. Cl......................... E04c 3/32, G04b 17/20
[58] Field of Search............ 33/168, 115; 52/1, 111, 52/2, 573, 632; 165/81, 82, 84

[56] References Cited
UNITED STATES PATENTS

| | | | |
|---|---|---|---|
| 630,897 | 8/1899 | Kerris | 165/84 |
| 3,176,403 | 4/1965 | Meyer | 33/168 R |
| 3,643,733 | 2/1972 | Hall | 165/81 |

*Primary Examiner*—John E. Murtagh
*Attorney, Agent, or Firm*—John M. May; W. H. MacAllister

[57] ABSTRACT

A strut capable of fine adjustments in length is disclosed. In the preferred embodiment hydraulic fluid introduced under pressure into the space between two coaxial tubular elements causes the inner element to contract in diameter and to expand in length as a function of the fluid pressure, a flange being provided at either end of the inner element. A single-ended embodiment and a double acting double-ended embodiment are also disclosed. The device may be used wherever a structural element capable of fine adjustments in length is required. A particular advantage of the device disclosed is its open tubular construction.

6 Claims, 7 Drawing Figures

HYDRAULICALLY EXTENSIBLE STRUT

This is a continuation, of application Ser. No. 235,740, filed Mar. 17, 1972, now abandoned.

GENERAL STATEMENT OF SUBJECT MATTER

The present invention relates to mechanical devices and more particularly to a hydraulically actuated mechanical strut utilizing Poisson's principle.

BACKGROUND OF THE INVENTION

The requirement in precision mechanical systems for structural elements of finely adjustable length has spawned a variety of mechanizations. Amongst these were the rack and pinion, the screw, the hydraulic piston, as well as devices utilizing thermal expansion. They could be servo-controlled so that a fixed dimension may be maintained regardless of fluctuations in load and in temperature, as was the case in my U.S. Pat. No. 3,468,080 for a controlled strut, the teachings of which are incorporated by reference herein. However, each of the above-mentioned mechanizations found in the prior art had its limitations. Among these limitations were problems relating to backlash, reliability, size and weight, and response time.

SUMMARY OF THE INVENTION

One object of this invention is to provide an improved lengthwise adjustable structural member for use in a precision mechanical system.

Another object of this invention is to provide an adjustable structural member that is free from backlash.

Yet another object of this invention is to provide an adjustable structural member that is light in weight and open in construction.

Still another object of this invention is to provide an adjustable structural member having a rapid response time.

A specific object of this invention is to provide a hydraulically controlled adjustable structural member suitable for use in a controlled strut application.

These and other objectives are satisfied by the present invention which employs two closely fitting coaxial tubular strut members with provision for controllably introducing pressurized fluid into the tubular space between the strut members. A fluid-tight seal is provided at each end of the tubular space. At least one such seal may be designed to permit axial movement of the inner member with respect to the outer member. In accordance with Lame's equation, the fluid pressure causes the inner member to contract in diameter and to expand in length, while the outer member expands in diameter and contracts in length. Accordingly, changes in the pressure of the hydraulic fluid will effect fine adjustments to the axial dimension of the structural member.

DESCRIPTION OF THE DRAWINGS

For a more detailed understanding of the invention, reference is made to the following detailed description of preferred embodiments thereof taken in conjunction with the accompanying drawings wherein.

DESCRIPTION OF THE PREFERRED EMBODIMENT

Figure 1:
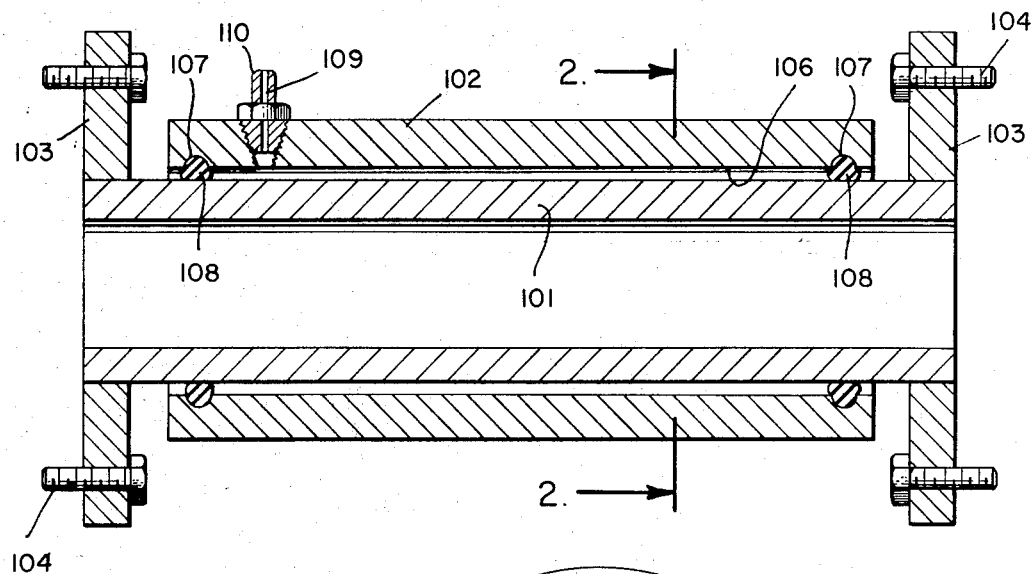
FIG. 1 is a side view partly in section of a preferred embodiment of the invention.
Figure 2:
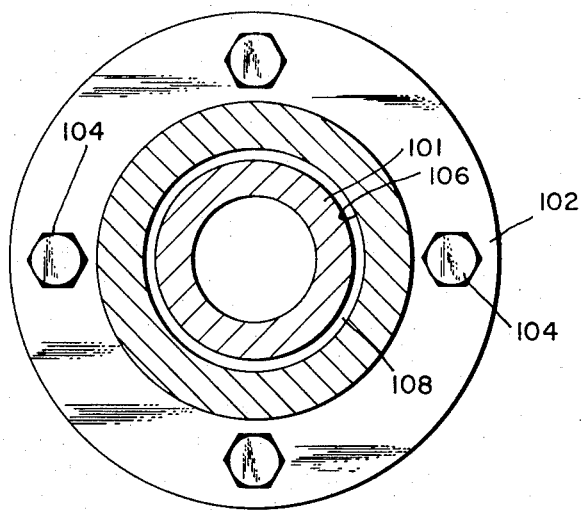
FIG. 2 is a cross-sectional view taken along line 2—2 of FIG. 1.

As can be seen readily from FIGS. 1 and 2, the extensible strut comprises an inner strut 101 and an outer jacket 102. Inner strut 101 is of tubular construction and has a flange 103 attached at each end, used for attaching the strut to other elements (not shown) of a mechanical system by means of bolts 104. Surrounding the inner tubular strut 101 is outer tubular jacket 102 which has a length somewhat shorter than strut 101. Strut 101 and jacket 102 should be made of a material of high tensile strength, for example, steel. The inner diameter of tubular jacket 102 is slightly larger than the outer diameter of tubular strut 101 resulting in a tubular space 106 between the two tubular members 101 and 102. The radial dimension of the space 106 has been greatly exaggerated in the drawing, it being preferable to have only a so-called "slip-fit" between the inner and outer struts, in order that the total volume of hydraulic fluid within the space 106 may be minimized. It may be noted that one of the advantages of the present invention is that only a relatively small volume of fluid is being compressed as the fluid pressure is increased, resulting in a relatively fast response time in a servo-controlled application. The outer jacket 102 has two laterally spaced apart annular grooves 107 on its inner circumferential surface in the vicinity of each end. Within each of the grooves 107 is an O-ring 108, used to provide a hermetic seal for the space 106. O-ring 108 permits a slight axial movement of the inner tubular strut 101 with respect to outer tubular jacket 102, while at the same time ensuring that the space 106 remains sealed. A small passage 109 leads from the space 106 to a hydraulic fitting 110 through which hydraulic fluid may be introduced under pressure into the space, thereby causing the inner tube 101 to lengthen.

It should be noted that the relative proportions of the various components illustrated in the figures have been exaggerated in the interest of clarity, in particular, the radial dimension of space 106 should be much smaller for efficient operation. It should also be noted that flanges 103 could be attached to the outer tubular member 102 instead of the inner tubular member 101, thereby resulting in a strut assembly which shortens in length upon the application of hydraulic pressure into the space 106.

DESCRIPTION OF ALTERNATE EMBODIMENTS

Figure 3:
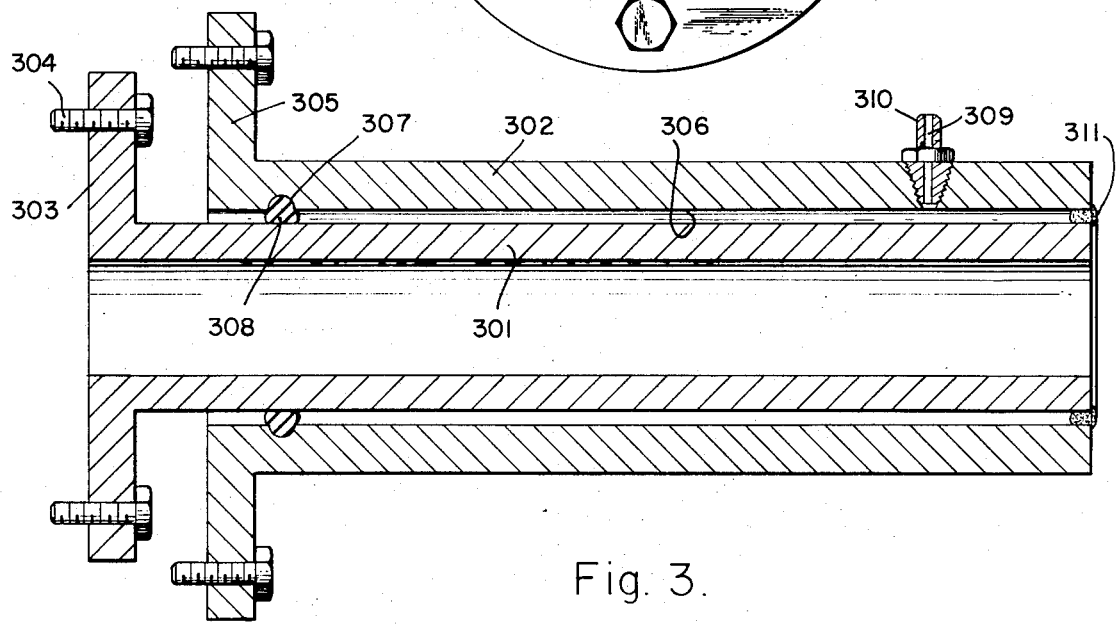
FIG. 3 shows a side elevation of an alternate, single ended, embodiment.

The single-ended embodiment of FIG. 3 is similar to the embodiment of FIG. 1, and accordingly components in the embodiment of FIG. 3 which correspond to components in the FIG. 1 embodiment are designated by the same reference numerals as their counterpart components in FIG. 1, except for the substitution of the prefix numeral 3. The embodiment of FIG. 3 differs from that of FIG. 1 by the addition of flange 305 to the outer tube 302 and the provision of only one flange 303 on the inner tube 301. Furthermore, the end of inner tube 301 remote from the remaining flange 303 is rigidly attached by a weld joint 311 to the end of tube 302 remote from flange 305. The space 306 is sealed at one end by the weld joint 311, and only one annular groove 307 and one O-ring 308 are required to seal the other end of space 306. The result is an adjustable strut having at one end two flanges, the distance between them regulated by hydraulic pressure introduced through fitting 310 and passage 309 into space 306.

Figure 4:
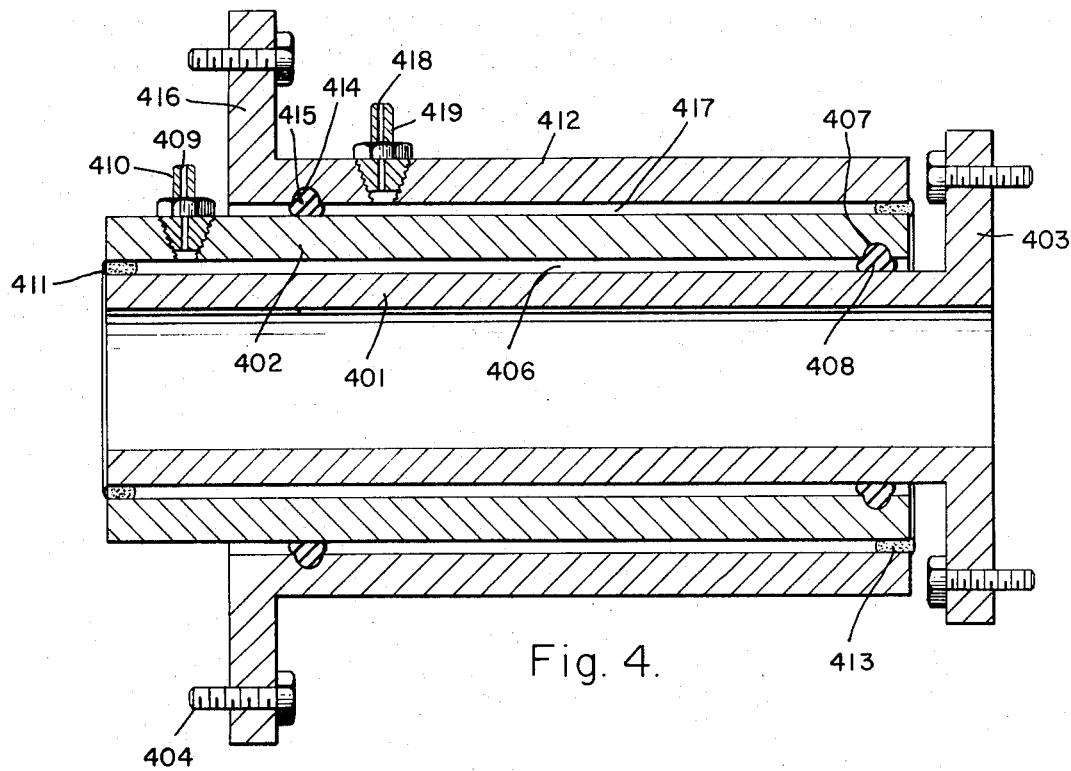
FIG. 4 shows a double-ended, double-acting embodiment of the invention.

FIG. 4 shows a double-ended double-acting embodiment of the invention, its reference numerals having the prefix 4. It may be visualized as the single-ended embodiment illustrated in FIG. 3, but with flange 305 replaced by a second outer tube 412. Outer tubular jacket 412 is connected at one end to intermediate tubular member 402 by a weld joint 413, the other end of tube 412 having an inner annular groove 414, an O-ring 415, and an outer flange 416. The space 417 (defined by the outer surface of intermediate tube 402, the inner surface of outer tube 412, welded joint 413 and O-ring 415) is connected by a passage 418 to a hydraulic fitting 419. As will become more evident in the next section under the heading "Operation," hydraulic pressure applied through fitting 410 will cause an increase in the dimension between flange 403 and flange 416, while hydraulic pressure applied through hydraulic fitting 419 will cause the dimension between the flanges 403 and 416 to decrease.

OPERATION

It is well known from the theory of elasticity that a load (stress) applied to a solid body along one axis will cause dimensional increases (strain) along the other two axes. The relationship between the stress applied and the resulting strain is characterized by Poisson's ratio ($\theta$) and Young's modulus (E), which are functions of the material involved.

Figure 5:
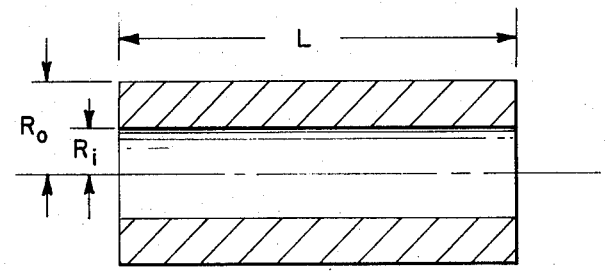
FIGS. 5A, 5B, and 5C show an idealized tube and are included to illustrate the physical principles underlying this invention.
Figure 5A:
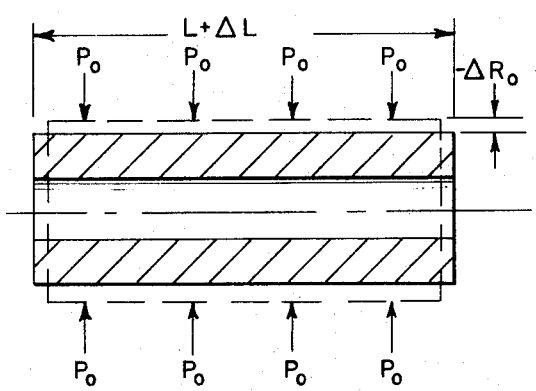
Figure 5B:
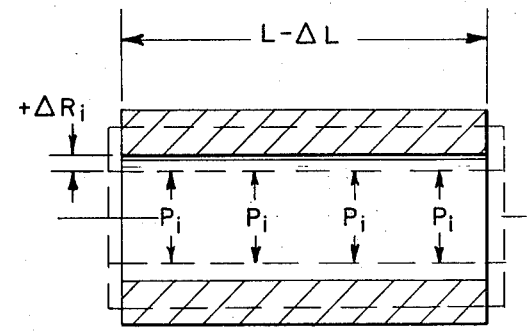

Referring now to FIGS. 5a, 5b and 5c, FIG. 5a illustrates in cross-section a tube having a length L, an outer radius $R_o$ and an inner radius $R_i$. FIG. 5b shows that same tube after it has been subjected to a stress in the form of pressure ($P_o$) evenly distributed about the tube's outer lateral surface. The result (shown in solid lines) is a tube of increased length represented mathematically as $L+\Delta L$, while at the same time resulting in a tube of reduced outer and inner radii. The resultant increase in length is given by the following equation (which is derived in detail below):

$$\Delta L = L \, (2\theta \, P_o R_o^2 / E(R_o^2 - R_i^2)).$$

(1)

In other words, the increase in length is directly proportional to the external pressure applied. Similarly, in the case of an internal pressure ($P_i$) applied to the inner lateral surface of the tube as shown in FIG. 5c, the decrease in length is given by:

$$\Delta L/L = -2\theta \, P_i \, R_i^2 / E(R_o^2 - R_i^2);$$

(2)

that is to say, the decrease in length is directly proportional to the internal pressure.

For a unit cube, the relationship between the stress applied, and the resulting strain is given by:

$$\epsilon_x = S_x - \theta(S_y + S_z)/E;$$

(3)

$$\epsilon_y = S_y - \theta(S_x + S_z)/E; \text{ and}$$

(4)

$$\epsilon_z = S_z - \theta(S_x + S_y)/E;$$

(5)

where:
 $\epsilon$ = Elongation (strain/length);
 $S$ = Stress/area;
 $\theta$ = Poisson's ratio; and
 $E$ = Young's modulus.

When an inner pressure $P_i$ and an outer pressure $P_o$ are applied to the inner and outer circumferential surfaces respectively of a thick-walled cylinder, a circumferential, hoop or tangential stress $S_t$, and a radial stress $S_r$ (perpendicular to $S_t$) result. The relationship between the applied pressure and the resulting stresses is given by the so-called Lame equations:

$$S_t(r) = (R_i^2 P_i - R_o^2 P_o) + (P_i - P_o)(R_i^2 R_o^2/r^2)/R_o^2 - R_i^2$$

(6)

and $$S_r(r) = (R_i^2 P_i - R_o^2 P_o) - (P_i - P_o)(R_i^2 R_o^2/r^2)/R_o^2 - R_i^2$$

(7)

where $r$ is the radial distance of the point within the cylinder wall. Using the Lame equations for the stresses along two axes (radial and tangential) of a unit cube within the cylinder wall results in the following expression for the axial elongation $\epsilon_z$ of the cylinder subjected to internal and external pressures:

$$\epsilon_z(r) = -\theta/E \, (S_t(r) + S_r(r)) = -2\theta/E \, (R_i^2 P_i - R_o^2 P_o/R_o^2 - R_i^2)$$

(8)

From this it follows that the elongation $\epsilon_z$ is uniform for all points within the wall of the cylinder. If $P_i$ is negligibly small compared to $P_o$, this equation may be simplifed as:

$$\epsilon_z \approx 2\theta \, R_o^2 P_o / E(R_o^2 - R_i^2);$$

(9)

and for the case where $P_i \gg P_o$:

$$\epsilon_z \approx -2\theta \, R_i^2 P_i / E(R_o^2 - R_i^2)$$

(10)

Furthermore, it should be noted that the circumferential elongation $\epsilon_t$ at a radial distance $r$ is given by:

$$\epsilon_t(r) = 1/E \, ((S_t(r) - \theta S_r(r))$$

(11)

which in the case of a pressure $P_i$ applied to the inner circumference results in a positive inner bore radius increase $\Delta R_i$:

$$\Delta R_i = R_i \epsilon_t(R_i) = R_i P_i / E \, (R_o^2 + R_i^2 / R_o^2 - R_i^2 + \theta)$$

(12)

and in the case of a pressure $P_o$ applied to the outer circumference results in a decrease in outer bore radius $R_o$:

$$\Delta R_o = R_o \epsilon_t(R_o) = -R_o P_o/E\, (R_o^2 + R_i^2/R_o^2 - R_i^2 + \theta)$$

(13)

Referring now back to FIG. 1, it can be seen that the hydraulic fluid in space 106 exerts a pressure on the outer surface of cylinder 101. The distance L in this case corresponds to the distance between the two O-rings 108. In an exemplary double ended hydraulic extensor similar to that illustrated in FIG. 1, the following actual parameter values may be employed:

$L = 32$ inches (distance between O-rings 108)
 $\theta = 0.27$ (Poisson's ratio for steel)
 $E = 29$ million (Young's modulus for steel)
 $R_o = 0.625$ inches (outer radius of inner tube 101)
 $R_i = 0.433$ inches (inner radius of inner tube 101)
 $P_o = 5,000$ pounds/square inch.

Use of these values in equation (1) above, results in a calculated increase in length:

$\Delta L = 0.0057$ inches.

This value compares closely with a measured value of approximately 0.0053 inches for a hydraulic extensor fabricated from steel in accordance with the above stated dimensions. For outer tube 102, appropriate dimensions are:

$R_i = 0.630$ inches
 $R_o = 0.750$ inches

Using these values, decrease in length calculated from equation (2) is:

$\Delta L = -0.0072$ inches which compares closely to the measured value of $-0.0073$ inches.

If the same materials and dimensions were used for an arrangement such as shown in FIG. 3, wherein one end of the inner tube is rigidly connected to the corresponding end of the outer tube, then a positive pressure of 5,000 psi introduced into the space 306 would cause the inner tube to lengthen by approximately 0.0057 inches and the outer tube to contract by approximately 0.0072 inches. The distance between flanges 303 and 305 would therefore be increased by a total of 0.0129 inches.

The double-acting embodiment of FIG. 4 may similarly be analyzed. Considering first the pressure introduced into inner space 406, the effective length L is then the distance between O-ring 408 and the closed end in the vicinity of weld joint 411. Thus, increase of pressure introduced through fitting 410 into space 406 results in a proportional increase of the dimension between flanges 416 and 403. (It should be noted that tube 412 is not subjected to hydraulic pressure in this instance and therefore it neither lengthens nor contracts as a result of the application of the hydraulic fluid into space 406).

If, however, hydraulic pressure is introduced through fitting 419 into space 417, then intermediate tube 402 will expand in length, outermost tube 412 will contract in length, and flange 416 will move away from weld joint 411 and toward flange 403. Thus, the effective length of the whole structural member, that is the distance between flanges 416 and 403, will decrease since innermost tube 401 is not subjected to any expansion or contraction forces.

Although the above discussion has assumed no external forces transmitted to the structure through the flanges or other equivalent attachment means, it should be obvious to one skilled in the mechanical arts that the invention is equally applicable to the situation where suitable control of the applied hydraulic pressure can be used to maintain a constant length between the attaching flanges, for example in the face of variable external forces which would otherwise tend to expand and contract the length of the assembly. Furthermore, regulation of the hydraulic pressure may be used to compensate for internal stresses in the assembly caused by thermal expansion, acceleration or other internal forces.

Without further analysis, the foregoing will fully reveal the gist of the present invention so that others can be applying current knowledge readily adapt it for various applications without omitting features that fairly constitute essential characteristics of the generic or specific aspects of this invention. Such adaptations should and are intended to be comprehended within the purview of the invention.

What is claimed is:

1. An adjustable strut assembly comprising an inner tubular member having a longitudinal axis and a constant outer radius $R_o$ for the greater portion of its length therealong;

an outer tubular member coaxially disposed about said inner member and having a constant inner radius $R_i$ for the greater portion of its length in slip-fit dimensional relationship with said inner tube outer radius, said radius $R_i$ not exceeding said radius $R_o$ by more than approximately 0.005 inch;

hermetic sealing means disposed between opposing portions of said inner member and said outer member at longitudinally spaced locations along said constant radius portions for providing in conjunction with said portions a thin tubular fluid-tight space; and means for controllably introducing pressurized fluid into said tubular space.

2. The adjustable strut assembly as in claim 1 wherein said sealing means comprises at least one O-ring disposed at one of said lateral locations, thereby permitting relative movement between said inner member and said outer member.

3. The adjustable strut assembly as in claim 2 wherein said sealing means further comprises a second O-ring disposed at another of said lateral locations.

4. The adjustable strut assembly as in claim 2 wherein a portion of said inner member and a portion of said outer member are rigidly connected to one another at another of said lateral locations.

5. A double-acting adjustable strut comprising:

an inner tubular member having a longitudinal axis;

an intermediate tubular member coaxially disposed about said inner member;

first rigid sealing means connecting one end region of said inner member to a corresponding end region of said intermediate member;

first flexible sealing means disposed between opposing portions of said inner member and said intermediate member for providing in conjunction with said first rigid sealing means and opposing lateral surfaces of said inner and intermediate members a first thin tubular fluid-tight space, and for permitting relative lateral movement between said inner and intermediate members in the vicinity of said first flexible sealing means;

an outer tubular member coaxially disposed about said intermediate member;

second rigid sealing means connecting one end region of said outer member to the end region of said intermediate member remote from said first rigid sealing means;

second flexible sealing means disposed between opposing portions of said intermediate member and said outer member for providing in conjunction with said second rigid sealing means and opposing lateral surfaces of said intermediate and outer members a second thin tubular fluid-tight space, and for permitting relative lateral movement between said intermediate and outer members in the vicinity of said second sealing means; and means for controllably and independently introducing pressurized fluid into said first and second tubular spaces.

6. The double-acting adjustable strut of claim 5 further comprising:

a first attachment flange disposed adjacent the end of said inner member remote from said first rigid sealing means; and a second attachment flange disposed adjacent the end of said outer member remote from said second rigid sealing means.

* * * * *